Dec. 27, 1966 J. M. TEWKSBURY ETAL 3,295,070
DIODE TUNED CIRCUITS
Filed March 19, 1962
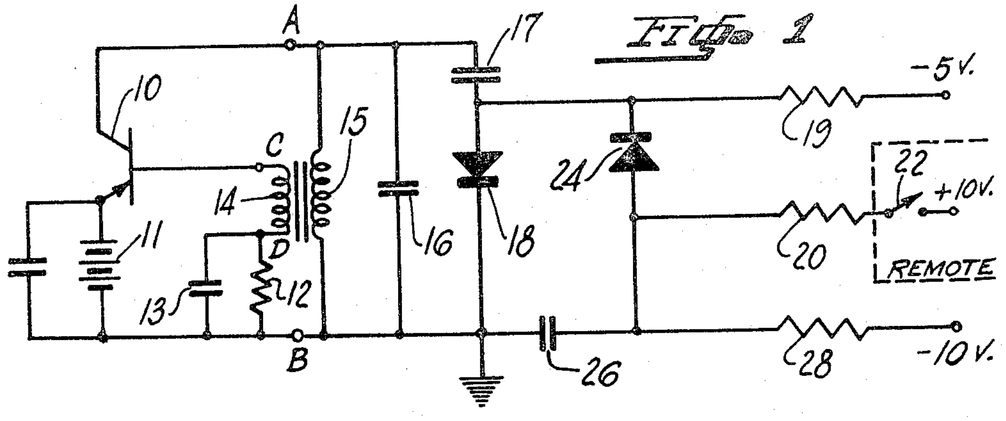
FIG. 1
FIG. 2
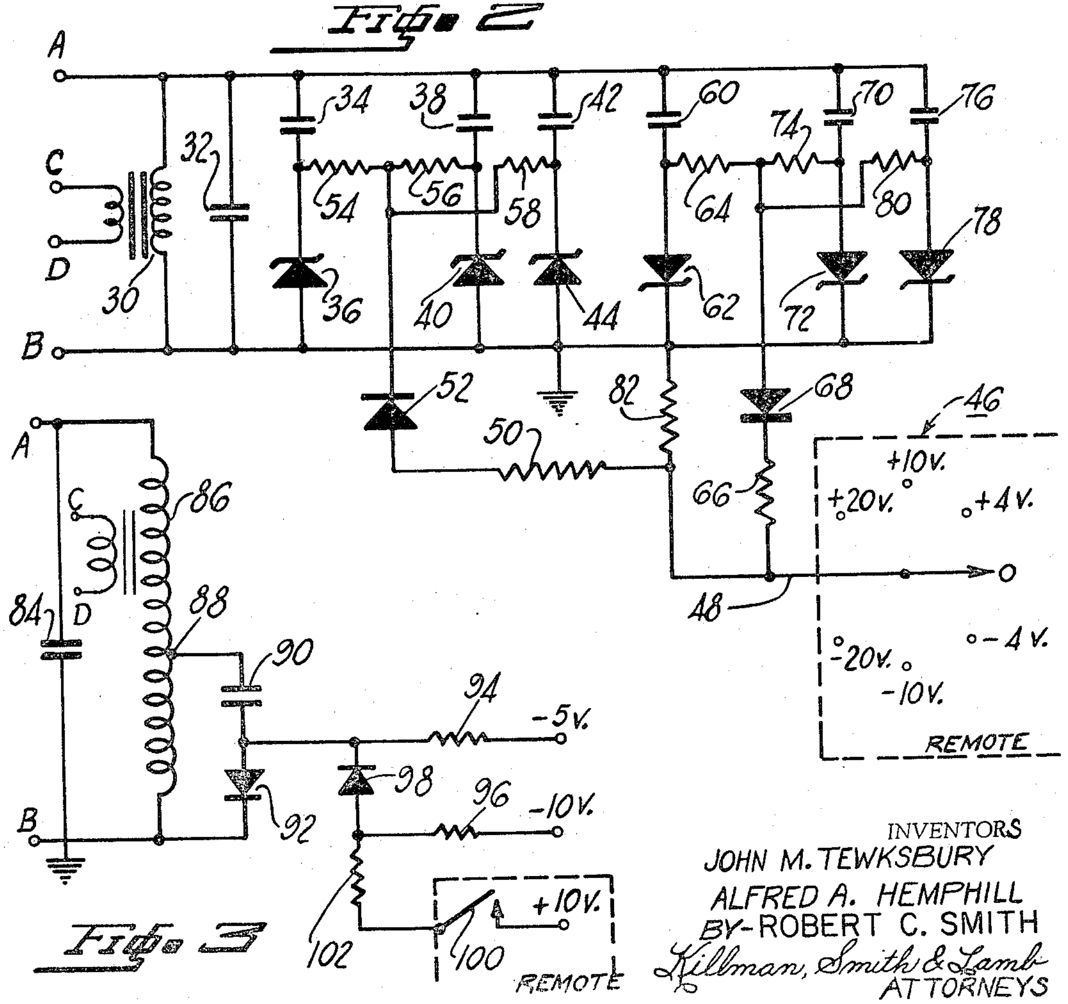
FIG. 3
INVENTORS
JOHN M. TEWKSBURY
ALFRED A. HEMPHILL
BY ROBERT C. SMITH
Killman, Smith & Lamb
ATTORNEYS United States Patent Office 3,295,070
Patented Dec. 27, 1966

3,295,070

DIODE TUNED CIRCUITS

John M. Tewksbury, Lutherville, Alfred A. Hemphill, Baltimore County, and Robert C. Smith, Timonium, Md., assignors to The Bendix Corporation, Towson, Md., a corporation of Delaware Filed Mar. 19, 1962, Ser. No. 180,465
3 Claims. (Cl. 331—179)

This invention relates to radio receiving and transmitting equipment and more particularly to a means for effecting the tuning or adjusting of such equipment without the use of moving parts.

In airborne equipment especially, it is often necessary that a control panel be at some distance from the actual receiver or transmitter or other equipment which it is desired to tune or adjust. Consequently, it has been necessary to connect the control panel to the associated equipment by means of a number of wires, the number being dependent upon the number of functions which must be controlled. Where a substantial number of frequencies must be selected on such equipment, it has often been necessary to resort to electromechanical switching means of some considerable weight and size often involving an electric motor at each end and a large number of interconnecting wires—often more than one such wire for each frequency selected. This has disadvantages not only because of the size and weight of the motor devices themselves with their attendant gear trains, etc., but also because of the number of interconnecting wires required. In modern aircraft such cables of wires often weigh substantially as much as the equipment itself. This means for effecting the desired switching is also undesirable because such mechanical means is subject to damage and inaccuracies from vibration and shock.

A means which has been proposed for eliminating such electromechanical tuning means involves the use of a series of voltage variable semiconductor capacitors to effect the desired tuning. This system is operable but open to the objection that such semiconductor capacitors are variable in their input voltage versus capacitance characteristics with changes in ambient temperature and aging.

It is therefore an object of the present invention to provide a frequency switching system for use in electronic equipment in which the disadvantages attendant with the use of moving mechanical parts are eliminated.

It is another object of the present invention to provide a frequency switching system for electronic equipment in which the number of interconnecting wires between a control panel and said equipment may be materially reduced.

It is another object of the present invention to provide a frequency switching system in which the power consumption is substantially less then is usual with systems presently in use.

It is a further object of the present invention to provide a frequency switching system which is smaller in volume and lighter than systems presently in use while maintaining a high degree of reliability.

It is a further object of the present invention to provide a frequency switching system which accomplishes the above objectives and in which temperature and aging affects of the components used are minimized.

Other objects and advantages will become apparent from the following specification taken in connection with the accompanying drawings in which:

FIG. 1 is a schematic diagram of a frequency switching system using our invention;

FIG. 2 is a schematic diagram of another embodiment of our invention; and

FIG. 3 is a schematic diagram of another embodiment of our invention.

Referring now to FIG. 1, an oscillator circuit is shown including a transistor 10 powered by means of a battery 11 connected to its emitter. The other side of the battery is connected through a biasing resistor 12, bypassed by means of a capacitor 13, and a feedback winding 14 to the base of transistor 10. The collector of this transistor is connected to a tuned circuit for establishing a desired frequency which includes a second winding 15 inductively related to winding 14 and a capacitor 16 connected in parallel with each other and with a capacitor 17 and a diode 18 connected in series. Connected to this tuned circuit is a switching circuit consisting of a resistor 19 of high value connected to a first voltage source here indicated as being $-5$ volts, a second resistor 20 connected to a second voltage source, here indicated as $+10$ volts, through a switch 22 and connected to the tuned circuit through a diode 24. A capacitor 26 effectively connects a terminal between diode 24 and resistor 20 to ground. Also connected to this terminal is a third resistor 28 of high value which is connected to a third voltage source, indicated as $-10$ volts.

From this arrangement, it will be recognized that resistor 28 and the $-10$ volt source act as a bias source with respect to the diode 24 to hold the diode in a non-conducting state so long as the switch 22 is open. The $-5$ volt source connected to diode 18 also keeps this diode in a non-conducting state. These diodes thus effectively appear as open circuits to the tuned circuit and the resonant frequency is established by the inductance of windings 15, the capacitance of capacitor 16 only. Resistor 19 does affect the tuned circuit but it is made a high value so that this effect is minimized. When the switch 22 is closed, sufficient voltage is applied to bias the diodes 18 and 24 in the forward direction and a current flows from the $+10$ volt source through resistor 20 and diodes 24 and 18 to ground. These diodes thus appear to have very low values of resistance. Since capacitor 17 is in series with diode 18, it is effectively coupled into the tuned circuit. Thus, with the switch 22 closed, the resonant frequency will be determined by inductor 15 and capacitors 16 and 17. Typically, the switch 22 will be part of a control panel located at a substantial distance from the receiver or transmitter which it is desired to tune. Only one long wire, that between switch 22 and resistor 20, need be connected between these components to control the switching back and forth between two frequencies.

A modification is shown in FIG. 2 which permits switching an oscillator tuned circuit to any of several frequencies by means of one switch and a single long wire. In this system the terminals A, B, C and D would connect to like terminals in FIG. 1, replacing the frequency changing system. The tuned circuit includes an inductor 30 with a capacitor 32 connected in parallel with the inductor. Also connected in parallel with inductor 30 and capacitor 32 are a first circuit consisting of a capacitor 34 and a Zener diode 36; a second circuit including a capacitor 38 and a Zener diode 40, and a third circuit including a capacitor 42 and a Zener diode 44. As is well understood by those skilled in the art, the Zener diodes conduct very little when inverse voltages are applied until a certain threshold inverse voltage is reached and then they suddenly begin to conduct substantial amounts of current and continue to so conduct for increasing inverse voltages. Such diodes are supplied with a wide variety of values of inverse breakdown voltages. These three auxiliary circuits are connected to remotely located variable voltage source including a switch 46 by means of a wire 48 having connections with a resistor 50 and a diode 52 which is connected to conduct positive voltages to said circuits across their individual isolating resistors 54, 56 and 58, respectively. Also effectively connected in parallel with said tuned circuit are other auxiliary circuits including a capacitor 60 and a Zener diode 62 connected with wire 48 through an isolating resistor 64, a resistor 66 and a diode 68 poled to pass negative voltages; a capacitor 70 and a Zener diode 72 connected to diode 68 through an isolating resistor 74; and a capacitor 76 and a Zener diode 78 connected with diode 68 through an isolating resistor 80. These auxiliary circuits are connected to ground through a resistor 82 of comparatively high value.

Operation of the circuit of FIG. 2 is analogous of that of FIG. 1. When the switch 46 is open or on the zero voltage position, as shown, none of the auxiliary circuits are connected and the resonant frequency is established through the interaction of inductor 30 and capicitor 32 only. When switch 46 is moved to the +4 volt position, the inverse breakdown voltage of Zener diode 36 is exceeded and current flows through wire 48, resistor 50, diode 52, isolating resistor 54 and Zener diode 36 to ground. This brings capacitor 34 into the tuned circuit in parallel with capacitor 32, thereby changing the resonant frequency of the combination to a new value. When the switch 46 is moved to the +10 volt position, the inverse breakdown voltage of Zener diode 40 is exceeded and current additionally flows from the power source through the auxiliary circuit including isolating resistor 56 and Zener diode 40 to ground, thus bringing capacitor 38 into parallel with capacitors 32 and 34, further altering the resonant frequency of the tuned circuit. When switch 46 is moved to the +20 volt position, the inverse breakdown voltage of Zener diode 44 is exceeded, causing it to conduct and the capacitance of capacitor 42 is added to that of capacitors 32, 34 and 38 in the tuned circuit. When a negative voltage, such as −4 volts, is selected on the switch 46, the diode 52 blocks any current flow into the circuits with which it is connected and diode 68 conducts. Current flow is from ground through Zener diode 62, isolating resistor 64, diode 68, resistor 66 and to the power source through switch 46. Increasing negative supply voltage to the −10 volt and −20 volt values will result in exceeding the inverse breakdown voltages of Zener diodes 72 and 78, respectively, thus adding the capacitance of capacitors 70 and 76 to that of capacitors 32 and 60. From this specific arrangement it is apparent that one wire 48 may carry different voltages resulting in remote selection of any one of seven different frequencies. Other combinations could be chosen for individual circuits since seven is by no means a limit. Similarly, combinations of such circuits may be used to multiply the number of available frequencies on a geometric basis with correspondingly few wires between the frequency selecting circuits and the control panel. Limitations will be imposed by such factors as the kind and number of power sources available, minimum practicable differences in the inverse breakdown voltages of the Zener diodes used, the number of long connecting wires which can be accommodated, etc.

The modification shown in FIG. 3 uses a switching arrangement similar to that of FIG. 1 but uses the switching means to vary the inductance rather than the capacitance of the tuned circuit. In this embodiment the tuned circuit consists of a capacitor 84 connected in parallel with an inductor 86 tapped at 88 and which may be connected at points A and B of FIG. 1, as shown. Connected across part of inductor 86 between the tap 88 and ground is a circuit consisting of a capacitor 90 and a diode 92. This circuit is connected through a resistor 94 to a −5 volt source; through a resistor 96 and a diode 98 to a −10 volt source; and through a switch 100 and a resistor 102, which is much smaller in value than resistor 96, to to a +10 volt source. Capacitor 90 is a by-pass capacitor and is much larger in value than capacitor 84.

With switch 100 open, the diode 92 is reverse biased and no significant current flows through capacitor 90 and capacitor 92 and the inductance of the entire coil 88 is in the circuit. Closing of switch 100 causes the voltage from the +10 volt source to overcome that from the −10 volt source (because of the difference in the values of resistors 96 and 102) and current flows in the forward direction across diodes 98 and 92 to ground, thus effectively shorting out the turns of winding 86 below tap 88. This raises the resonant frequency of the tuned circuit. It will be apparent that a multiple position switching arrangement such as that shown in FIG. 2 could as well be adapted to the system of shorting successive groups of turns of the inductance in the tuned circuit, as to add capacitance.

While only a limited number of embodiments have been shown and described herein, many modifications can be effected without departing from the spirit and scope of the invention.

We claim:

1. For use with an oscillator including a resonant circuit having an inductor and a capacitor, variable frequency selecting means comprising:

a plurality of circuits connected in parallel with said inductor and said capacitor, each of said circuits including capacitance means and Zener diode means, said diode means in each of said circuits having different selected inverse breakdown voltages, and variable power supply means connected to said circuits capable of selectively providing operating voltages exceeding the individual breakdown voltages of said diodes for causing conduction through individual circuits whereby said capacitance means are selectively placed in said resonant circuit.

2. For use with an oscillator including a resonant circuit having an inductor and a capacitor, variable frequency selecting means comprising:

a plurality of circuits connected in parallel with said inductor and said capacitor, each of said circuits including series connected capacitance means and Zener diode means, said diode means in each of said circuits having different selected inverse breakdown voltages and each being connected to initially present high resistance to voltages of a first polarity below its value of inverse breakdown voltage;

a second plurality of circuits connected in parallel with said inductor and said capacitor, each of said circuits including series connected capacitance means and Zener diode means, said diode means in each of said circuits having different inverse breakdown voltages and each being connected to initially present high resistance to voltages of a second polarity below its value of inverse breakdown voltage;

variable power supply means having connections to said circuits capable of selectively providing a plurality of individually selectable voltages of said first and second polarities capable of selectively exceeding the inverse breakdown voltages of said Zener diodes;

and said connections including a first diode connected to said first named plurality of circuits such that it presents a low resistance only to current of said first polarity, and a second diode connected to said second plurality of circuits such that it presents a low resistance to current of said second polarity.

3. For use with an oscillator including a resonant circuit having inductive reactance means and capacitive reactance means connected in parallel, variable frequency selecting means comprising:

a plurality of circuits connected in parallel with said inductive reactance means and said capacitive reactance means each of which comprises serially connected reactance means and conduction controlling means capable of preventing flow through its particular circuit until current of a first polarity and a desired voltage level is applied thereto;

a second plurality of circuits connected in parallel with said inductive reactance means and said capacitive reactance means each of which comprises serially connected reactance means and conduction controlling means capable of preventing flow through its particular circuit until current of a second polarity and a desired voltage level is applied thereto;

variable power supply means having connections to said circuits capable of selectively providing a plurality of individually selectable voltages of said first and second polarities capable of exceeding said desired voltage levels for each of said circuits;

and said connections including a first unidirectional conducting device connected to said first named plurality of circuits such that it presents a low resistance only to current of said first polarity and a high resistance to current of said second polarity, and a second unidirectional conducting device connected to said second plurality of circuits such that it presents a low resistance to current of said second polarity and a high resistance to current of said first polarity.

References Cited by the Examiner

UNITED STATES PATENTS

| | | | |
|---|---|---|---|
| 2,588,551 | 3/1952 | McCoy | 331—181 X |
| 2,930,991 | 3/1960 | Edwards | 331—179 X |
| 2,959,726 | 11/1960 | Jensen. | |
| 3,070,754 | 12/1962 | Wu | 331—179 X |
| 3,092,787 | 6/1963 | Pohlman et al. | 331—179 X |

FOREIGN PATENTS

| | | |
|---|---|---|
| 1,267,593 | 6/1961 | France. |
| 1,090,727 | 10/1960 | Germany. |

ROY LAKE, *Primary Examiner.*

J. B. MULLINS, *Assistant Examiner.*